United States Patent Office 3,068,242
Patented Dec. 11, 1962

3,068,242
PRODUCTION OF N-DIALKYL AND N-DIARALKYL PHOSPHORYLHOMOCYSTEINE THIOLACTONES
Werner Schwarze, Frankfurt am Main, Germany, assignor to Deutsche Gold- und Silber-Scheideanstalt vormals Roessler, Frankfurt am Main, Germany
No Drawing. Filed Aug. 5, 1960, Ser. No. 47,596
Claims priority, application Germany Aug. 11, 1959
2 Claims. (Cl. 260—332.3)

The present invention concerns a process for the production of N-dialkyl and N-diaralkyl phosphorylhomocysteine thiolactones of the general formula $$\begin{array}{c} CH_2-CH_2-CH-NH-P \overset{O}{\underset{OR_2}{\diagup}} \overset{OR_1}{\diagdown} \\ | \qquad\qquad | \\ S \!-\!\!-\!\!-\!\!-\! CO \end{array}$$

It is known that amino acid esters can be reacted with dialkyl phosphoryl chloride in the presence of an inert solvent and an acid acceptor. Tertiary bases or the amino acid esters themselves can serve as the acid acceptors.

It is also known that amino acid amides, such as glycinamide, can be reacted with diisopropylphosphoryl chloride.

It is furthermore known that amino acids can be treated with phosphorus oxychloride to produce phosphoric acid derivatives of the following formula in poor yields:

$$\begin{array}{c} O \\ \| \\ R-CH-NH-PCl_2 \\ | \\ COOH \end{array}$$

In special instances, such as, for example, when using methionine as the starting material, no reaction takes place. The derivatives which are obtained cannot be converted to the corresponding esters.

According to the invention it was unexpectedly found that N-dialkyl and N-diaralkyl phosphorylhomocysteine thiolactones can be produced in good yields by reacting homocysteine thiolactone or its salts, such as its hydrohalides with a phosphoryl halide of the following formula:

$$\begin{array}{c} R_1O \diagdown \overset{O}{\underset{}{\|}} \\ \qquad P-X \\ R_2O \diagup \end{array}$$

in which $R_1$ and $R_2$ are alkyl or aralkyl radicals and X is a halogen atom, in the presence of an acid acceptor. Preferably the phosphoryl chlorides are used as the phosphoryl halide reactant.

Expediently the reaction is carried out in the presence of a solvent or suspending medium. It is not necessary that the solvent or suspending medium be absolutely inert. Hydroxyl group containing solvents, preferably methyl and ethyl alcohol, for example, can be used with advantage. Mixtures of solvents also can be used.

The process according to the invention can be carried out at room temperature and lower but it is promoted at higher temperatures. Advantageously it is carried out at temperatures between 0 and 80° C. It is especially advantageous to operate under an inert gas atmosphere.

The acid acceptors employed are known per se, such as, for example, pyridine, dimethylamine and others. It was found that tertiary alkyl amines, such as tributylamine, trimethylamine, triethylamine and the like are particularly suited as acid acceptors.

The thiolactone ring of the starting homocysteine thiolactone is not destroyed in the reaction according to the invention. The ring, however, can be easily opened up by treatment with weak alkalies to produce the corresponding N-dialkyl or N-diaralkyl phosphorylhomocysteines. The compounds produced according to the invention possess pharmacological properties and are especially non-toxic. They are, for example, therapeutically as well as prophylactically active in liver damage (hepatitis). Furthermore, they have a protective action against radiation.

The alkyl radicals $R_1$ and $R_2$ are lower alkyl groups with 1 to 6 C-atoms or lower aralkyl groups with 1 nucleus and a lower alkylene radical.

The following examples will serve to illustrate several embodiments of the invention.

Example 1

16.2 g. of homocysteine thiolactone hydrochloride were suspended in 125 cc. of methanol under a protective nitrogen atmosphere. Then 17.3 g. of diethylphosphoryl chloride were added while cooling and thereafter a mixture of 20.2 g. of triethylamine and 25 cc. of methanol was slowly dropped in a period of 30 minutes while stirring. A clear solution resulted which was permitted to stand overnight and then evaporated to dryness under vacuum. The residue was taken up in benzene whereby the phorphorous compound went into solution and triethylamine hydrochloride remained as undissolved residue. The benzene was evaporated off from the solution under vaccum and an oil remained which soon crystallized. After recrystallization from a benzene-petroleum ether mixture 22 g. of a pure white crystalline substance having a melting point of 64–65° C. were obtained. Upon analysis the following values were found: N=5.76%, S=12.4%, P=12.6%. Calculated for $C_8H_{16}O_4NPS$: N=5.53%, S=12.6%, P=12.3%.

The structural formula of the compound is $$\begin{array}{c} CH_2-CH_2-CH-NH-P \overset{OC_2H_5}{\underset{OC_2H_5}{\diagup}} \\ | \qquad\qquad | \qquad\quad \overset{\|}{O} \\ S \!-\!\!-\!\!-\!\!-\! CO \end{array}$$

Example 2

11.7 g. of homocysteine thiolactone (M.P. 214° C.) were suspended in 150 cc. of benzene and 17.3 g. of diethylphosphoryl chloride added thereto and the suspension cooled to 10° C. 18.5 g. of tributylamine were then dropped in at this temperature and the mixture thereafter heated slowly to 40–45° C. and stirred at this temperature for 4 hours. The mixture was then filtered and the filtrate boiled down under vacuum. 22.1 g. of N-diethylphosphorylhomocysteine thiolactone of a melting point of 64–65° C. were obtained.

Example 3

15.4 g. of homocysteine thiolactone hydrochloride were suspended in 150 g. of isopropanol. A solution of 6 g. of trimethylamine in 50 cc. of benzene were then added under a nitrogen atmosphere. Thereafter, 20.1 g. of diisopropylphosphoryl chloride were added and the mixture stirred for 20 hours at 20° C. Then the mixture was boiled down under vacuum and the residue extracted with benzene. After the solvent was driven off a colorless half-crystalline oil remained. Yield 29.3 g.

*Analysis.*—N - diisopropylphosphoryl homocysteine, thiolactone, mol. wt.=281: Calc.—N=4.98%, S=11.38%, P=11.03%. Found N=4.9%, S=11.27%, P=11.14%.

Example 4

16.2 g. of homocysteine thiolactone hydrochloride were suspended in 200 ccm. of benzene. A solution of 27.9 g. of dibenzylphosphoryl chloride in 100 ccm. benzene was added. There were added during 30 minutes 20.9 g. triethylamine whereby the mixture was stirred and cooled. After stirring 3 hours the mixture becomes neutral. The mixture was filtered off and the residue on the filter was washed with water. The filtrate was boiled down under vacuum, and the residue was recrystallised in ethanol. Yield 31.2 g. N-dibenzylphosphorylhomocysteine thiolactone in the form of white crystals.

I claim:

1. A phosphorylhomocysteine thiolactone of the formula

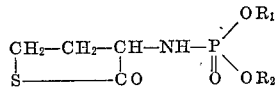

in which $R_1$ and $R_2$ are selected from the group consisting of lower alkyl and phenyl lower alkylene groups.

2. A phosphorylhomocysteine thiolactone of the formula

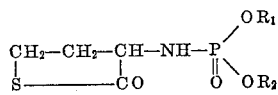

in which $R_1$ and $R_2$ are lower alkyl.

References Cited in the file of this patent

UNITED STATES PATENTS 2,842,527    Melamed _____ July 8, 1958
2,852,550    Godfrey _____ Sept. 16, 1958

OTHER REFERENCES

Cook et al.: Journal of the Chemical Society (London), 1949, pp. 2921–7.